United States Patent
Vasquez

(10) Patent No.: US 7,464,640 B2
(45) Date of Patent: Dec. 16, 2008

(54) FRYING/BOILING STAND WITH HOIST

(76) Inventor: Arnold S. Vasquez, 7049 Novara Pl., Rancho Cucamonga, CA (US) 91701

( * ) Notice: Subject to any disclaimer, the term of this patent is extended or adjusted under 35 U.S.C. 154(b) by 653 days.

(21) Appl. No.: 11/155,546

(22) Filed: Jun. 20, 2005

(65) Prior Publication Data

US 2006/0283335 A1    Dec. 21, 2006

(51) Int. Cl.
    *A47J 37/12*    (2006.01)
    *B66C 19/00*    (2006.01)

(52) U.S. Cl. .......................................... 99/407; 212/97

(58) Field of Classification Search .................. 99/403, 99/407, 419–421 HV; 126/30, 24 A, 25 R, 126/25 AA; 212/97–116
See application file for complete search history.

(56) References Cited

U.S. PATENT DOCUMENTS

| | | | | |
|---|---|---|---|---|
| 1,200,649 | A * | 10/1916 | Quiinn | 254/335 |
| 2,730,244 | A * | 1/1956 | Berggren | 212/271 |
| 3,691,936 | A * | 9/1972 | Chiarelli | 99/337 |
| 3,973,754 | A * | 8/1976 | Chadwick, Jr. | 254/323 |
| 4,043,260 | A | 8/1977 | LaPour et al. | |
| 4,658,710 | A * | 4/1987 | Quet et al. | 99/445 |
| 5,850,829 | A | 12/1998 | Taylor et al. | |
| 5,896,810 | A * | 4/1999 | Barbour | 99/415 |
| 6,186,137 | B1 | 2/2001 | Lewis | |
| 6,584,967 | B1 | 7/2003 | Paumen et al. | |

OTHER PUBLICATIONS

Internet Document, www.donkihote.com/outdoor/atrr0803.asp, 2 pages printed from the Internet on Feb. 1, 2005.

\* cited by examiner

*Primary Examiner*—Sang Y Paik
(74) *Attorney, Agent, or Firm*—Richard C. Litman

(57) ABSTRACT

A frying/boiling stand with hoist includes a hoist supported for rotation by opposed end frames. The hoist includes an axle, a centrally located spindle hood, and axle housings extending between the spindle hood and the opposed end frames. The axle centrally supports a cable having a lower hook, the cable forming a coil within the spindle hood. The hoist has a crank mounted on an end portion of the axle for turning the axle. A stop is located on one end frame for engaging the hoist. A food item is suspended by said hook over a fryer/boiler for raising and lowering by turning the axle crank. The food item, upon completion of cooking, is hoisted from the fryer/boiler by the hoist by turning the axle and the stop applied to maintain the axle fixed, thereby suspending the food item above the fryer/boiler for removal from the hook.

18 Claims, 5 Drawing Sheets

FRYING/BOILING STAND WITH HOIST

BACKGROUND OF THE INVENTION

1. Field of the Invention

The present invention relates to cooking equipment. More particularly, the present invention relates to a supported hoist for lowering a food item into and out of a cooking vat such as a fryer/boiler.

2. Description of the Related Art

The deep-frying of turkeys has become popular. The cooking operation is not without risk. The heavy turkey may be dropped into the hot oil, splashing it over the rim of the cooking vat, resulting in a fire. Also, the chef may have miscalculated the amount of hot oil needed and oil may overflow the cooking vat rim upon submerging the turkey, also resulting in a fire. The placing of a turkey directly into the vat of hot oil is therefore dangerous to the chef who must lean over the vat and carefully place the turkey inside. This is an awkward effort which may result in back strain as well as burns from a fire.

The use of turnbuckle hoist stands is known for adjusting the height of a grill or rotisserie relative to a cooking fire. Such stands are inadequate in design to carry a heavy turkey and are not optimal for the careful and controlled lowering of a turkey into hot oil in a vat. It would be desirable to provide a cooking stand having the ruggedness and raising and lowering control necessary to safely deep fry a turkey in an open vat. Such a cooking stand would also be desirable for handling heavy pots of water for boiling food over an open fire.

None of the above inventions and patents, taken either singly or in combination, is seen to describe the instant invention as claimed. Thus, a frying/boiling stand with hoist solving the aforementioned problems is desired.

SUMMARY OF THE INVENTION

The frying/boiling stand with hoist of the present invention includes a hoist supported for rotation by opposed end frames. The hoist includes an axle, a centrally located spindle hood, and axle housings extending between the spindle hood and the opposed end frames. The axle centrally supports a cable, the cable forming a coil within the spindle hood. The hoist has a crank mounted on an end portion of the axle for turning the axle. A stop is located on one end frame for engaging the hoist. A hook is located at the free end of the cable for suspending a food item over a fryer/boiler vat. A food item is suspended by said hook over a fryer/boiler and, upon releasing the stop and turning the axle crank in one direction, the coil unwinds and the hook is lowered by the free end of the cable into the fryer/boiler vat. The food item, upon completion of cooking, is hoisted from the fryer/boiler by the hoist by turning the axle crank in the other direction and the stop applied to maintain said axle fixed, thereby suspending the food item above the fryer/boiler for removal from the hook.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
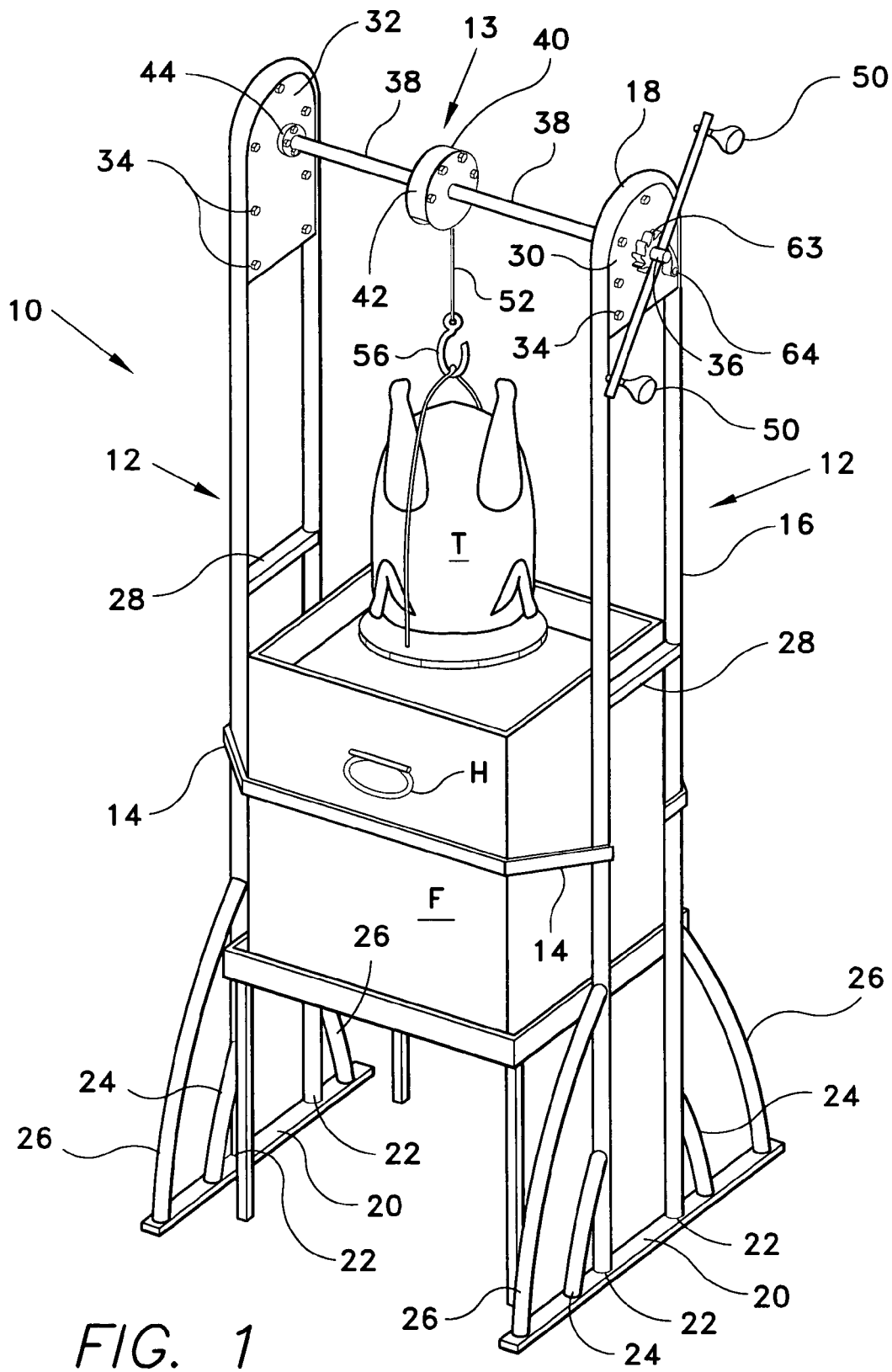
FIG. 1 is an environmental, perspective view of a frying/boiling stand with hoist according to the present invention.
Figure 2:
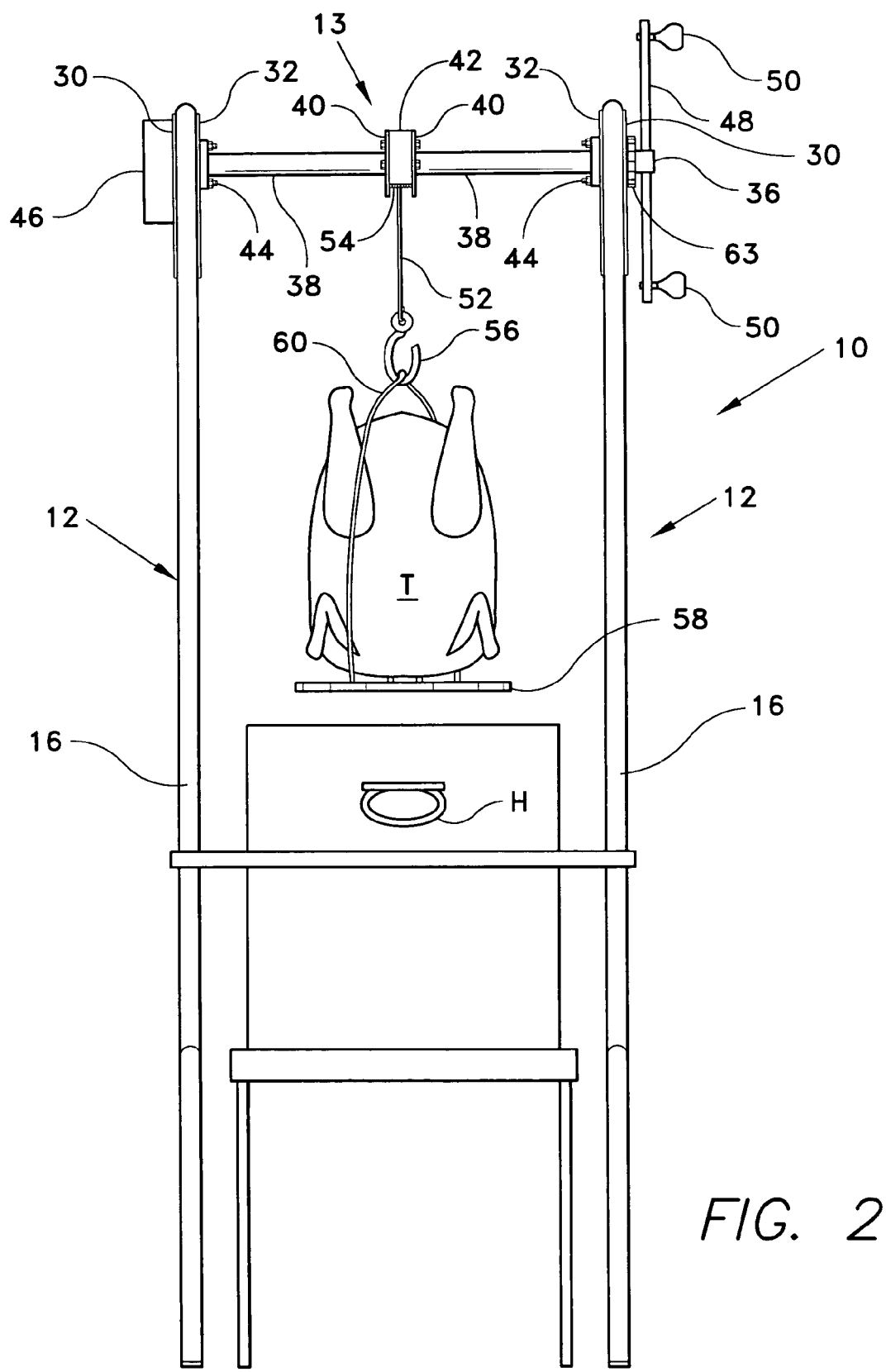
FIG. 2 is a front elevation view of the frying/boiling stand of FIG. 1.
Figure 3:
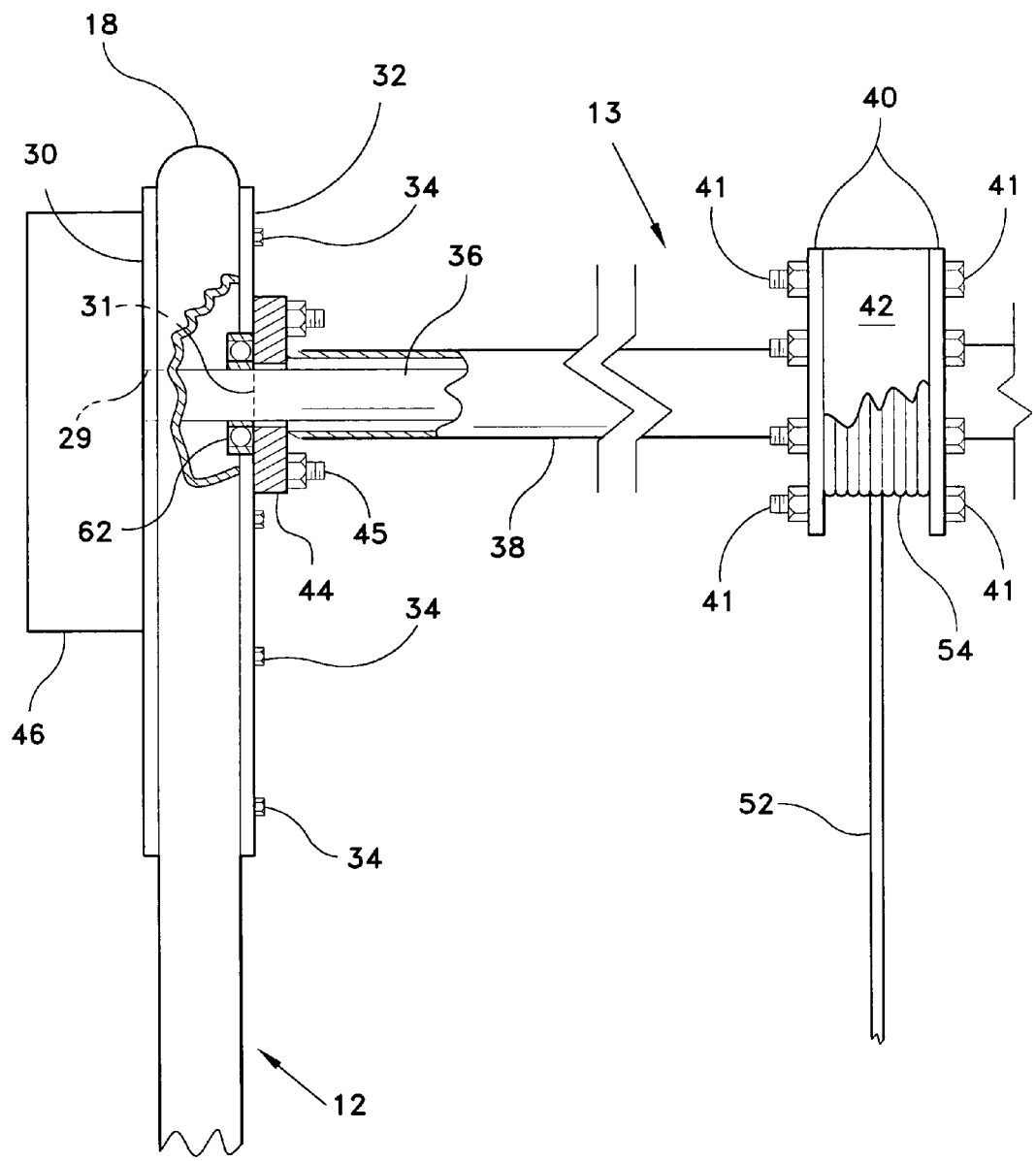
FIG. 3 is a detail view, partially cut away of the hoist of the frying/boiling stand of FIG. 1.
Figure 4:
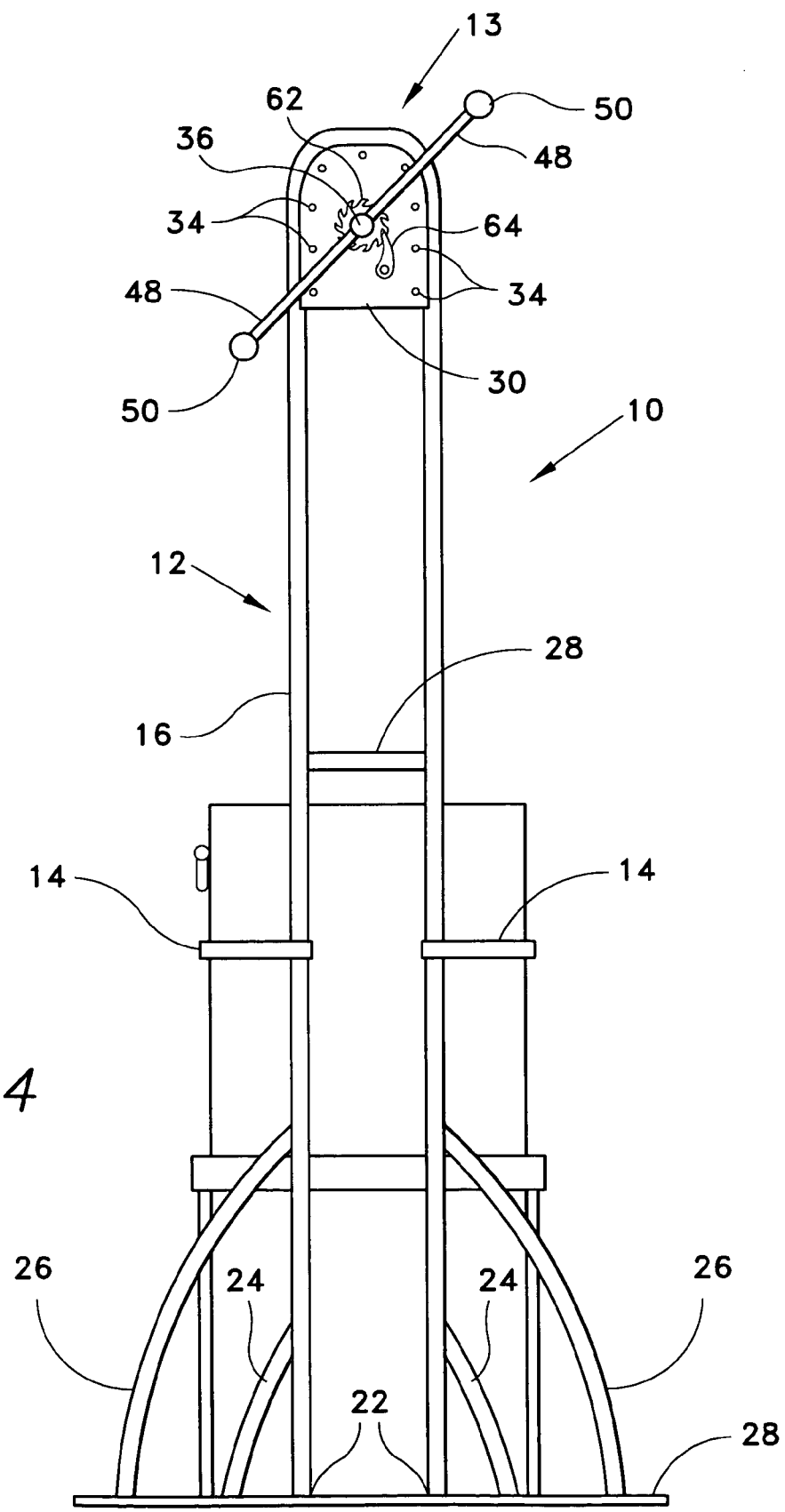
FIG. 4 is an end elevation view of the frying/boiling stand of FIG. 1.

The present invention is a stand for deep frying or boiling an item of food. The stand has a hoist for supporting an item such as a turkey with features allowing the food item to be safely lowered into a pot of hot oil or water for cooking and for raising and suspending the food item above the hot oil or water once the cooking is done. The stand may also safely support a heavy pot of water over an open fire for sterilizing the water or for boiling foods.

Referring to the FIGS. 1-4, there is shown a frying/boiling stand 10 having tubular end frames 12 and a safety belt 14 extending between mutual front and rear frame central uprights 16, respectively, for holding the stand 10 vertically with respect to the vat fryer F having handle H. End frames 12 extend upward on opposed sides of the fryer F and support the hoisting mechanism extending over the fryer F therebetween. End frame central uprights 16 are preferably a single length of metal tubing bent backward at the frame top to form frame upper "U"-shaped curved ends 18. The lower ends 22 of the frame central uprights are attached to rectangular frame bases 20 in any desired manner such as welding. Each end frame 12 has inner struts 24 and outer struts 26 extending from each respective fame base 20 to respective front and rear frame central uprights 16. A stiffening support tube 28 extends between each respective front and rear frame central upright of end frames 12.

The upper portions of each end frame 12 have an upper inner mounting plate 32 and an upper outer mounting plate 30 attached to each side of the tubing by any desired means such as throughbolts 34. An axle 36 extends through tubular axle housings 38, inner end plates 32 and outer end plates 30. Axle housings 38 include central bolt plates 40, which attache to spindle hood 42 by central axle housing bolts 41 (see FIG. 3). Axle housings 38 also include outer end plates 44 attached to upper inner mounting plates 32 by outer axle housing studs or bolts 45 (see FIG. 3). Axle 36 has an axle crank attached at one end having axle crank handles for manually turning axle 36 so as to raise and lower the hoist apparatus. Cable 52 forms a cable coil 54 attached to and wrapped around axle 36 between axle housing central bolt plates 40 (see FIG. 3). Cable 52 has a cable hook at its free end 56 for holding a cooking apparatus such as turkey support 58 held by turkey support cable 60. Axle 36 is supported for rotation by axle support bearings 62 attached to upper inner plates 32 within axle receiving apertures 31. Axle 36 may extend through similar apertures 29 in outer plates 30, one end portion ending within a housing 46 which may contain an electric stepper motor (not shown) as desired for turning axle 36, and the other end portion extending through axle crank 48 for attachment thereto. A ratchet gear 62 is located between the upper outer plate 30 and axle crank 48 and turns with axle 36, a pawl 64 being rotatably attached to upper outer plate 30 which may be manually operated to stop axle 36 from turning so as to suspend turkey T at a desired level in fryer F and above fryer F for removal of the cooked turkey T.

Figure 5:
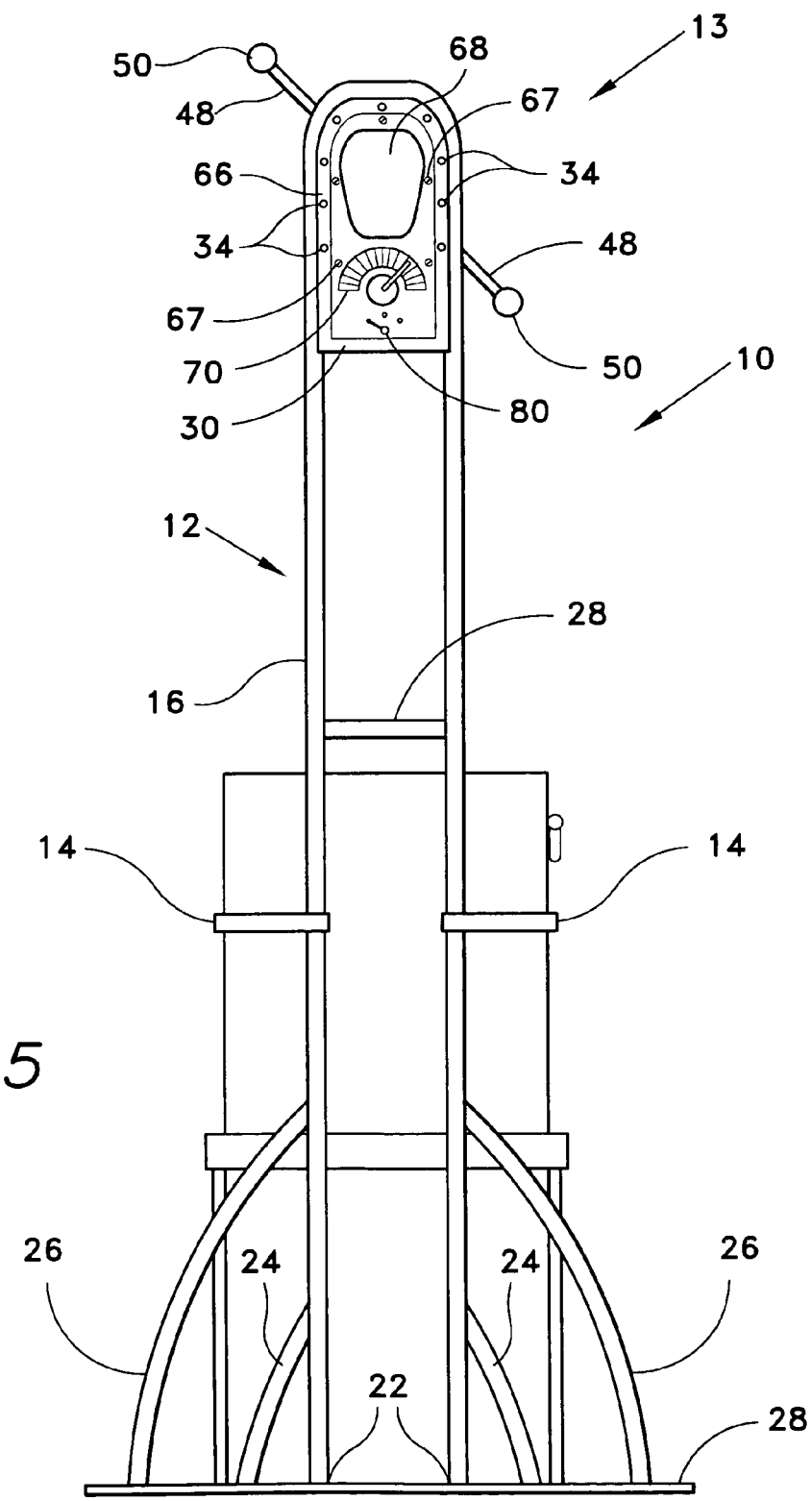
FIG. 5 is an end elevation view of another embodiment of the frying/boiling stand, similar to that of FIG. 1.

As seen in FIG. 5, a motor and timer housing 66 may be substituted for axle end motor housing 46 and attached to upper outer plate 30 by screws 67. A stepper motor 68 provides for turning axle 36 in a desired direction to lift or lower turkey T. The stepper motor 68 is operated by a toggle switch 80 having raise, off, and lower positions. The timer 70 may give an audible signal to indicate the allotted time for cooking has expired. The timer 70 may also be electrically connected to electric stepper motor 68 (wiring not shown), and is settable to actuate motor 68 to turn axle 36 to raise hoist 13 and turkey T from fryer F after a set time has expired. The operation of the stepper motor is controlled by Axle end and motor housing 46 may be eliminated and axle crank 48 employed to operate the hoist 13 as desired. A kettle or perforated pot may also be hung on cable hook 56 of frying/boiling stand 10 for frying or boiling food as desired. The vat fryer F and the stepper motor, timer and electrical connections are conventional items, the details of which are not shown.

In operation, a turkey T is mounted on support 58 and hung on cable hook 56 by support cable 60. The pawl 64 is disengaged from ratchet gear 62 and the hoist 13 lowered by turning axle crank 48 until the turkey T is covered with oil (not shown) in fryer F. The pawl 58 is then engaged with ratchet gear 62 to support the turkey at the desired height. The turkey is allowed to cook and after the desired cooking period the axle crank 48 is turned the opposite direction until the hoist 13 raises turkey T to the desired level over the fryer F. The pawl 64 is then engaged with ratchet gear 62, securing the hoist 13, and the turkey removed. A cooking utensil may be similarly employed for cooking food by suspending by a handle on hook 56.

It is to be understood that the present invention is not limited to the embodiments described above, but encompasses any and all embodiments within the scope of the following claims.

I claim:

1. A frying/boiling stand with hoist for cooking in an open vat, comprising:
   a hoist;
   opposed end frames supporting said hoist for rotation;
   said hoist having an axle, a centrally located spindle hood, and axle housings attached to and extending between said spindle hood and said opposed end frames;
   said opposed end frames each having an upper portion and a lower frame base, each said upper portion having an upper inner mounting plate and an upper outer mounting plate attached to said upper portion, said axle housings each being attached to each respective said upper inner mounting plate;
   said axle supporting a cable, said cable forming a coil within said spindle hood;
   said hoist having a crank mounted on an end portion of said axle;
   a stop located on one said end frame for engaging said hoist; and
   a hook located at the free end of said cable;
   whereby a food item is suspended by said hook over a fryer/boiler and upon releasing said stop and turning said axle crank in one direction, said coil unwinds and said hook is lowered by the free end of said cable into said fryer/boiler vat; and
   whereby a food item, upon completion of cooking, is hoisted from said fryer/boiler by said hoist by turning said axle crank in the other direction and said stop applied to maintain said axle fixed and thereby suspending said food item above said fryer/boiler for removal from said hook.

2. The frying/boiling stand of claim 1, wherein each of said end frames comprise two tubular uprights and " gan upper inverted "U"-shaped formed by bending a single tube, said uprights being attached to an elongate rectangular base at their respective lower ends.

3. The frying/boiling stand of claim 2, each said end frame having an inner strut and an outer strut extending forward and rearward between respective said uprights and said elongate rectangular base.

4. The frying/boiling stand of claim 3, further comprising a cross bar extending between said two tubular uprights of each said end frame.

5. The frying/boiling stand of claim 2, further comprising at least one belt supported by said end frames and substantially surrounding said open vat.

6. The frying/boiling stand of claim 1, further comprising a ratchet gear attached to said axle inboard of said crank and a rotatable pawl attached to one said outer mounting plate adjacent said crank, whereby the hoist may be locked in a desired position to maintain said hook at a desired elevation.

7. The frying/boiling stand of claim 6, further comprising a bearing attached to each of said upper inner support plates supporting said axle for rotation.

8. The frying/boiling stand of claim 7, further comprising a stepper electric motor attached to the outer support plate opposite that supporting said pawl, said stepper electric motor being engaged with said axle so as to raise, hold, or lower said hoist and said hook.

9. The frying/boiling stand of claim 8, further comprising a timer electrically connected with said stepper motor so as to operate said motor to turn said axle and raise said hook upon the expiration of a set time.

10. A frying/boiling stand with hoist for cooking in an open vat, comprising:
    a hoist;
    opposed end frames supporting said hoist for rotation, said opposed end frames each having an upper portion and a lower frame base, each said upper portion having an upper inner mounting plate and an upper outer mounting plate attached to said upper portion;
    said hoist having an axle centrally supporting a cable, said cable forming a coil upon said axle;
    said hoist having a crank mounted on an end portion of said axle;
    a stop located on one said end frame for engaging said hoist; and
    a hook located at the free end of said cable;
    whereby a food item is suspended by said hook over a fryer/boiler and upon releasing said stop and turning said axle crank in one direction, said coil unwinds and said hook is lowered by the free end of said cable into said fryer/boiler vat; and
    whereby a food item, upon completion of cooking, is hoisted from said fryer/boiler by said hoist by turning said axle crank in the other direction and said stop applied to maintain said axle fixed and thereby suspending said food item above said fryer/boiler for removal from said hook.

11. The frying/boiling stand of claim 10, wherein each of said end frames comprise two tubular uprights and an upper inverted "U"-shaped formed by bending a single tube, said uprights being attached to an elongate rectangular base at their respective lower ends.

12. The frying/boiling stand of claim 11, further comprising at least one belt supported by said end frames and substantially surrounding said open vat.

13. The frying/boiling stand of claim 11, each said end frame having an inner strut and an outer strut extending forward and rearward between respective said uprights and said elongate rectangular base.

14. The frying/boiling stand of claim 13, further comprising a cross bar extending between said two tubular uprights of each said end frame.

15. The frying/boiling stand of claim 10, further comprising a ratchet gear attached to said axle inboard of said crank and a rotatable pawl attached to one said outer mounting plate adjacent said crank, whereby the hoist may be locked in a desired position to maintain said hook at a desired elevation.

16. The frying/boiling stand of claim 15, further comprising a bearing attached to each of said upper inner support plates supporting said axle for rotation.

17. The frying/boiling stand of claim 16, further comprising a stepper electric motor attached to the outer support plate opposite that supporting said pawl, said stepper electric motor being engaged with said axle so as to raise, hold, or lower said hoist and said hook.

18. The frying/boiling stand of claim 17, further comprising a timer electrically connected with said stepper motor so as to operate said motor to turn said axle and raise said hook upon the expiration of a set time.

* * * * *